US011692906B2

(12) United States Patent
Tonn

(10) Patent No.: US 11,692,906 B2
(45) Date of Patent: Jul. 4, 2023

(54) METHOD FOR DETERMINING GEOMETRICAL PARAMETERS OF A SOFT CONTACT LENS

(71) Applicant: ALCON INC., Fribourg (CH)

(72) Inventor: Thomas Tonn, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 44 days.

(21) Appl. No.: 17/443,626

(22) Filed: Jul. 27, 2021

(65) Prior Publication Data
US 2022/0034752 A1 Feb. 3, 2022

Related U.S. Application Data

(60) Provisional application No. 63/058,838, filed on Jul. 30, 2020.

(51) Int. Cl.
| | |
|---|---|
| *G01M 11/02* | (2006.01) |
| *G01B 9/02091* | (2022.01) |
| *G01B 11/24* | (2006.01) |
| *G06T 7/62* | (2017.01) |
| *G06T 7/13* | (2017.01) |

(52) U.S. Cl.
CPC ..... *G01M 11/0271* (2013.01); *G01B 9/02091* (2013.01); *G01B 11/2441* (2013.01); *G01M 11/025* (2013.01); *G06T 7/13* (2017.01); *G06T 7/62* (2017.01); *G06T 2207/10101* (2013.01)

(58) Field of Classification Search
CPC ... G01M 11/025; G01M 11/0271; G06T 7/13; G06T 7/62; G06T 2207/10101
See application file for complete search history.

(56) References Cited

U.S. PATENT DOCUMENTS

| | | | |
|---|---|---|---|
| 2008/0007694 A1 | 1/2008 | Wei | |
| 2011/0032533 A1* | 2/2011 | Izatt | ........................ G06T 5/006 |
| | | | 356/497 |
| 2015/0168250 A1* | 6/2015 | Saxer | ................. G01B 9/02064 |
| | | | 356/479 |
| 2018/0024077 A1 | 1/2018 | Tonn | |

(Continued)

FOREIGN PATENT DOCUMENTS

| | | |
|---|---|---|
| DE | 102018109649 A1 | 10/2019 |
| EP | 0604174 A2 | 6/1994 |

(Continued)

*Primary Examiner* — Michael A Lyons
(74) *Attorney, Agent, or Firm* — Sheng-Hsin Hu

(57) ABSTRACT

A method for determining geometrical parameters of a soft contact lens comprises the steps of
providing an OCT imaging device comprising an OCT light source;
providing a soft contact lens
arranging the soft contact lens relative to the OCT imaging device so light coming from the OCT light source impinges on the back surface of the soft contact lens;
generating a three-dimensional OCT image of the soft contact lens;
from the three-dimensional OCT image determining a plurality of edge points located on the edge of the soft contact lens,
connecting adjacent ones of the edge points by individual straight lines;
summing up the lengths of all individual straight lines to a length U of the approximated circumference of the soft contact lens;
from the length U determining a diameter D of the lens according to $D=U/\pi$.

9 Claims, 6 Drawing Sheets

(56) References Cited

U.S. PATENT DOCUMENTS

2018/0120199 A1    5/2018   Unterkofler et al.
2019/0195730 A1*   6/2019   Fechner ................. G01N 21/45

FOREIGN PATENT DOCUMENTS

| EP | 0607692 A2 | 7/1994 | |
|----|------------|--------|--|
| TW | 242175 B | 3/1995 | |
| TW | 242176 B | 3/1995 | |
| WO | WO-2019147936 A1 * | 8/2019 | ........... G01B 11/255 |

\* cited by examiner

METHOD FOR DETERMINING GEOMETRICAL PARAMETERS OF A SOFT CONTACT LENS

The present invention deals with a method for determining geometrical parameters of a soft contact lens.

BACKGROUND

The determination or measurement of geometrical parameters of contact lenses, in particular soft contact lenses, such as lens diameter, center thickness, base curve radius or base curve equivalent, is generally a cumbersome task. To perform these determinations or measurements it is known to arrange a contact lens in a container, for example in an inspection cuvette or other suitable container filled with an aqueous liquid, such as water, saline, or mixtures thereof. The contact lens is immersed in the liquid with the convex front surface of the contact lens facing upwards. A camera arranged above the cuvette/container captures an image of the contact lens in the container, and from this image the diameter of the contact lens may be determined as follows.

The determination of the lens diameter described in the following works well under the assumption that the shape of the lens edge is circular and that the entire lens edge rests on the support surface in the cuvette or container. A further assumption is that the profile of the lens is not deformed (e.g. in case of a soft contact lens no sagging occurs in the area near the center of the lens).

Typically, the center of the contact lens is determined from the camera image in a first step. Thereafter, at a plurality of azimuthal angular positions, for example at each of 100 different azimuthal angular positions distributed over the full azimuthal angle of 360 degrees at equidistant angular increments, a straight line is drawn from a first point located on the lens edge through the center of the contact lens to a second point on the lens edge which is located diametrically opposite relative to the center of the contact lens. The length of one such straight line represents one individual value for the diameter of the contact lens. After having determined one such individual value for the diameter at one particular azimuthal angular position, this procedure is reiterated for the remaining different incremental azimuthal angular positions. The individual values (in the example 100 values) for the diameters so obtained are summed up and divided by the number of values (in the instant example divided by 100) to obtain a mean value. This mean value is then determined to represent the diameter D of the contact lens.

Given the afore-mentioned assumptions (shape of the lens edge is circular, no deformations of the lens), the individual values for the diameters determined at the various azimuthal angular positions typically do not largely deviate from the mean value that represents the diameter D of the contact lens. For that reason, also the variance of the diameter (i.e. the square of the standard deviation) is calculated from the individual values for the diameter at the various azimuthal angular positions and from the mean value representing the diameter D of the contact lens. The variance (square of the standard deviation) is deemed to be indicative of the 'quality' of the determination of the lens diameter. That is, in case of a large variance it is assumed that the lens is defective leading to rejection of the lens. Obviously, each lens rejection has a negative effect on the yield of the lens production.

However, for example soft contact lenses having a toric front surface and a prism ballast for stabilizing the lens on the eye may exhibit an egg-like shape (due to the uneven mass distribution) when the lens edge is arranged on the support surface in the cuvette or container with the convex front surface of the soft contact lens facing upwards (as described above). As a consequence, the variance of the lens diameter may be comparatively large and the lens is likely to be rejected. However, upon being placed on the eye of the user, such soft toric contact lens may nevertheless perfectly adapt to the cornea and may actually provide the desired visual correction, so that rejection of the soft toric contact lens based on the high variance may be unjustified.

Regarding determination of the base curve radius of a contact lens having a spherical back surface, the base curve radius r may be determined from the sagittal height PSAG (i.e. the height from the level of the support surface in the cuvette or container on which the lens edge rests up to the level of the center of the back surface) as well as from the already determined diameter D of the contact lens according to $r \approx (\frac{1}{2} \cdot D)^2 / [2 \cdot PSAG]$.

In case the back surface of the contact lens is aspheric, due to the asphericity of the back surface it is not possible to determine a single base curve radius of the contact lens. In such cases, a base curve equivalent BCE is determined. The base curve equivalent BCE represents the radius of the best possible sphere that approximates the aspheric back surface of the contact lens within a diameter of, for example, 8 mm (i.e. 4 mm radius) about the center of the contact lens. The radius of this best possible sphere must extend from the center of the sphere to the back surface and to the lens edge of the aspheric contact lens.

To be able to calculate the base curve equivalent BCE, the sagittal height PSAG (i.e. the height from the level of the support surface of the cuvette or container up to the level of the center of the back surface) at the center of the contact lens is determined. From this sagittal height PSAG at the center of the contact lens as well as from the already determined diameter D of the contact lens, the base curve equivalent BCE is calculated according to $BCE \approx (\frac{1}{2} \cdot D)^2 / [2 \cdot PSAG]$.

Regarding determination of the center thickness of the contact lens, an interferometric measurement is performed. To properly determine the center thickness it is mandatory that the measurement beam of the interferometer impinges perfectly orthogonal on the front surface and back surface of the contact lens at the lens center. Also here, the profile of the lens must not be deformed (e.g. in case of a soft contact lens no sagging is allowed to occur in an area near the center of the lens).

However, due to the measurement beam of the interferometer impinging on the front surface of the contact lens, during determination of any geometrical parameters of the back surface the effect of refraction of the measurement beam at the front surface of the contact lens must be taken into consideration, resulting in much more complex calculations becoming necessary ('dewarping') to properly determine the geometrical parameters of the back surface of the contact lens.

As mentioned already, soft contact lenses having a toric front surface and prism ballast (due to their uneven mass distribution) may exhibit an egg-like shape when being arranged on the lens edge with the convex front surface facing upwards, so that an accurate determination of the diameter D of the contact lens may not be possible. Contact lenses which may be perfectly shaped may possibly be rejected. Moreover, accuracy of the determination of the diameter D may be significantly impaired since the edge of such contact lens may not entirely rest on the support surface in the cuvette. In addition, sagging of the soft contact lens in a central area of the lens may occur due to the softness of the contact lens material, so that the determination or measurement of the sagittal height PSAG may be significantly impaired. It may thus no longer be possible to reliably determine a base curve equivalent BCE.

Taking the afore-mentioned disadvantages into account it is an object of the instant invention to propose a method for determining geometrical parameters of soft contact lenses.

SUMMARY

The present invention now suggests a method for determining geometrical parameters of a soft contact lens. The method comprising the steps of
providing an OCT imaging device comprising an OCT light source;
providing a soft contact lens having a back surface and a front surface;
arranging the soft contact lens relative to the OCT imaging device such that light coming from the OCT light source impinges on the back surface of the soft contact lens;
irradiating the soft contact lens with light from the OCT light source and generating a three-dimensional OCT image of the soft contact lens using the OCT imaging device;
from the three-dimensional OCT image of the soft contact lens determining a plurality of edge points located on the edge of the soft contact lens;
connecting adjacent ones of the edge points in a circumferential direction by individual straight lines, of the individual straight lines having a length, to form an approximated circumference of the soft contact lens;
summing up the lengths of all individual straight lines, the sum of the lengths of all individual straight lines representing a length U of the approximated circumference of the soft contact lens;
from the so determined length U of the approximated circumference of the soft contact lens determining a diameter D of the soft contact lens according to the equation $D=U/\pi$.

In accordance with one aspect of the method according to the invention, the method further comprises the step of determining a center of the back surface of the soft contact lens by extracting the back surface of the soft contact lens from the three-dimensional OCT image, and by determining that point on the back surface to be the center of the back surface from which a sum of all shortest distances from that point along the back surface to all edge points is minimal.

In accordance with a further aspect of the method according to the invention, the method further comprises the step of determining a length L along the back surface from a first edge point of the plurality of edge points through the center to a second edge point located opposite to the first edge point relative to the center, and further determining a base curve equivalent BCE of the soft contact lens from the length L and the diameter D of the soft contact lens using the equation: $D=2\cdot BCE\cdot\sin(L/[2\cdot BCE])$.

In accordance with a further aspect of the method according to the invention, the method further comprises the steps of:
from the three-dimensional OCT image generating a plurality of two-dimensional OCT light sections of the soft contact lens, each individual two-dimensional OCT light section of the plurality of two-dimensional OCT light sections of the soft contact lens comprising two edge points of the plurality of edge points;
defining a boundary curve bounding each individual two-dimensional OCT light section;
determining the second derivative of the boundary curve of the two-dimensional OCT light section; and
determining the two edge points to be located at those locations at opposite ends of the two-dimensional OCT light section where the second derivative of the boundary curve of the two-dimensional OCT light section has a maximum.

In accordance with still a further aspect of the method according to the invention, a center thickness of the soft contact lens may be determined from the three-dimensional OCT image by calculating, at the center of the back surface of the soft contact lens, a plane tangential to the back surface of the soft contact lens. An axis running perpendicular to this tangential plane through the center of the back surface of the soft contact lens and through a front surface of the soft contact lens may be determined, and the center thickness of the soft contact lens may be determined to be the distance between the center of the back surface of the soft contact lens and the intersection of the axis with the front surface of the soft contact lens.

Yet in accordance with a further aspect of the method according to the invention, in case a (strong) central reflex occurs in the three-dimensional OCT image in a central area of the back surface of the soft contact lens caused by irradiating the soft contact lens with light from the OCT light source, a further three-dimensional OCT image may be generated by irradiating the soft contact lens with light of lower intensity from the OCT light source. The central reflex may be attenuated in the further three-dimensional OCT image to allow for determining the length L along the back surface or the center thickness of the soft contact lens. In the central area of the back surface of the soft contact lens the further three-dimensional image may be used for determining the length L along the back surface or the center thickness of the soft contact lens, or for determining both the length L along the back surface and the center thickness.

According to a further aspect of the method according to the invention, the soft contact lens may be arranged in a container filled with an aqueous liquid such as water, including deionized water, or a buffered solution, such as a buffered saline solution, or a mixture of the water and the buffered solution. The soft contact lens may be arranged completely immersed in the aqueous liquid.

In particular, the step of providing an OCT imaging system may comprise providing an OCT imaging system having a probe head comprising a planar liquid dip window through which the light from the OCT light source irradiates the soft contact lens immersed in the liquid in a predetermined irradiation direction, with a normal on the planar flat liquid dip window being arranged inclined relative to the predetermined irradiation direction.

The method according to the invention has a number of advantages over the prior art methods and is based on the assumption that the overall volume and the overall surface of the soft contact lens does not change even in case the lens deforms.

The soft contact lens is arranged relative to the OCT imaging device such that light coming from the OCT light source impinges on the back surface of the soft contact lens. In prior art methods the lens has been arranged such that the light has impinged on the front surface of the lens so that for the determination of any geometrical parameters of the back surface of the soft contact lens the effect of refraction caused by the front curve had to be considered and eliminated ('dewarping'). This has resulted in calculations of the geometrical parameters of the back surface becoming much more complex. Dewarping is no longer necessary in the method according to the invention (possibly with one exception, the determination of the center thickness where dewarping may be required at a single point). Also, it is no longer a requirement that the soft contact lens is not allowed to deform, nor is it a requirement anymore that the light impinges perfectly orthogonal on the center of the back surface or front surface of the soft contact lens.

Even in case the soft contact lens to be inspected is deformed (e.g. the soft contact lens may sag at the center due to the softness of the lens material, or in case of a toric soft contact lens the lens may deform due to prism ballast), it is reliably possible to determine the length U from the sum of the lengths of the individual straight lines connecting the adjacently arranged edge points (the lengths of the individual straight lines can be determined from the three-dimensional OCT image of the lens). The number of edge points is typically high (e.g. about 100 or even more), so that the length U is a very accurate approximation of the circumference of the soft contact lens. Having determined the length U (representing the circumference) the diameter D of the soft contact lens can be easily determined by the equation $D=U/\pi$.

Determination of the center of the back surface of the contact lens is possible in accordance with the invention even when the lens to be inspected is deformed. This determination is based on the assumption that the overall volume and the overall surface of the soft contact lens do not change even if the soft contact lens is deformed. Generally, the center of a surface of arbitrary shape is located where the sum of all distances between that center and all locations on the edge bounding the surface is minimal. For surfaces of arbitrary shape this is a known problem that can be solved with the aid of suitable software. By way of example, it can be solved with the software MATLAB available from the company MathWorks, Natick, Mass., U.S.A.

In the case of an edge of a contact lens that has a round (circular) edge, the distance from the center of the back surface to all edge points along the back surface of the contact lens has the same length. To find the said center of the back surface, a virtual center (i.e. a possible center) of the back surface of the soft contact lens is selected. For each of the edge points located on the edge of the soft contact lens the shortest length from that virtual center (which may not be the true center of the back surface of the contact lens) along the back surface to the respective edge point is determined. Thereafter, it is determined whether all individual shortest lengths from the virtual center along the back surface of the soft contact lens to the edge points have the same length. If they all have the same length, then this virtual center is determined to be the center of the back surface of the soft contact lens. Otherwise, a new virtual center is selected and the shortest lengths from the new virtual center to the edge points are determined again, until they all have the same length. This process is typically (iteratively) carried out by software running on a computer. In a practical embodiment, the term 'same length' in this regard means that the difference between the longest one and the shortest one of the shortest lengths from a virtual center to the edge points of the soft contact lens is smaller than a predetermined (small) threshold. The virtual center for which this threshold condition is fulfilled is determined to be the center of the back surface of the soft contact lens. Otherwise, the computer may continue running the (iterative) process endlessly in an attempt to find a virtual center for which the condition regarding 'the same length' is met is even better.

Determination of the base curve equivalent BCE of the soft contact lens is then also possible. Once the center of the back surface has been determined, the length L along the back surface of the soft contact lens from a first edge point through the center to a second edge point located opposite to the first edge point relative to the center is determined. This length L is the same for all edge points which are arranged opposite to each other relative to the center of the soft contact lens. The base curve equivalent is then determined according to the equation $D=2 \cdot BCE \cdot \sin(L/[2 \cdot BCE])$, with the diameter D and the length L already being known (see above). The base curve equivalent BCE may be numerically determined by a computer from this equation.

While other methods of determining the locations of the edge points (i.e. those points located on the edge of the soft contact lens) are conceivable as well, one determination of the locations of the first and second edge points comprises the generation of a plurality of two-dimensional OCT light sections of the soft contact lens from the three-dimensional OCT image. Each of these two-dimensional OCT light sections comprises two edge points of the plurality of edge points of the soft contact lens, however, the exact locations of these first and second edge points must be determined. For that purpose, a boundary curve bounding each individual two-dimensional OCT light section is defined, and the second derivative of the boundary curve is determined. The two edge points are then determined to be located at those locations at opposite ends of the two-dimensional OCT light section where the second derivative of the boundary curve of the two-dimensional OCT light section has a maximum. Obviously, this is possible based on the assumption that the edge of the soft contact lens is at that location where the curvature (i.e. the change of the first derivative) of the boundary curve of the respective individual two-dimensional OCT light section has a maximum at the opposite ends of the two-dimensional OCT light section. Accordingly, having defined the boundary curve bounding the respective individual two-dimensional OCT light section, the locations of the two edge points can be easily determined in this manner.

As regards determination of the center thickness, it is to be taken into account that the soft contact lens may have deformed. Therefore, it is necessary to determine the proper direction in which the center thickness is to be determined. For this reason, it is necessary to calculate a plane tangential to the back surface of the contact lens at the center of the back surface (the center of the back surface has already been determined before). The direction in which the center thickness is to be determined is the direction of an axis that runs perpendicular to this tangential plane through the center of the back surface and through the front surface of the soft contact lens. The center thickness is then determined to be the distance between the center of the back surface and the intersection of this axis with the front surface of the soft contact lens. The purpose of the tangential plane therefore is to properly determine the direction of the axis along which the distance between the center of the back surface and the intersection of the axis with the front surface of the soft contact lens (i.e. the center thickness) is to be determined.

In some instances a central reflex may occur in the three-dimensional OCT image in a central area of the back surface caused by the irradiation of the soft contact lens with light from the OCT light source which is too strong to allow for a proper determination of the length L along the back surface or the center thickness of the soft contact lens. In such instances a further three-dimensional OCT image is generated with light of lower intensity so that the central reflex is attenuated in this further three-dimensional image. For example, the central area may have a radius of 1 mm about the center of the back surface. In such case, in the central area the further three-dimensional image may then be used for determining the length L along the back surface or the center thickness of the soft contact lens, or both the length L along the back surface and the center thickness.

Also, it may be advantageous if the soft contact lens is placed in a container filled with an aqueous liquid, with the soft contact lens being fully immersed in the aqueous liquid. The techniques for inspecting soft contact lenses in such environment are generally known and allow for a highly reliable automated inspection of the soft contact lenses in an automated production line.

In particular, as regards the OCT imaging system, such system may have a probe head comprising a planar liquid dip window, with a normal on that planar flat liquid dip window being (slightly) inclined relative to the direction of irradiation. This avoids that (irradiation) light coming from the OCT light source is back reflected at the liquid dip window.

Finally, while in general a plurality of different methods are conceivable for determining the center of the back surface of the soft contact lens, one advantageous way to determine the center of the back surface is to determine that point of the three-dimensional OCT image to be the center of the back surface from which the sum of the distances to the edge points on the edge of the soft contact lens along the back surface is minimal. The determination of that point that fulfils this requirement is a known problem for surfaces having an arbitrary geometry, it can be solved with the aid of a suitable software like MATLAB available from the company MathWorks, Natick, Mass., U.S.A.

BRIEF DESCRIPTION OF THE DRAWINGS

Further advantageous aspects of the invention will become apparent from the following description of embodiments of the invention with the aid of schematic drawings in which.

DESCRIPTION OF EMBODIMENTS

Figure 1:
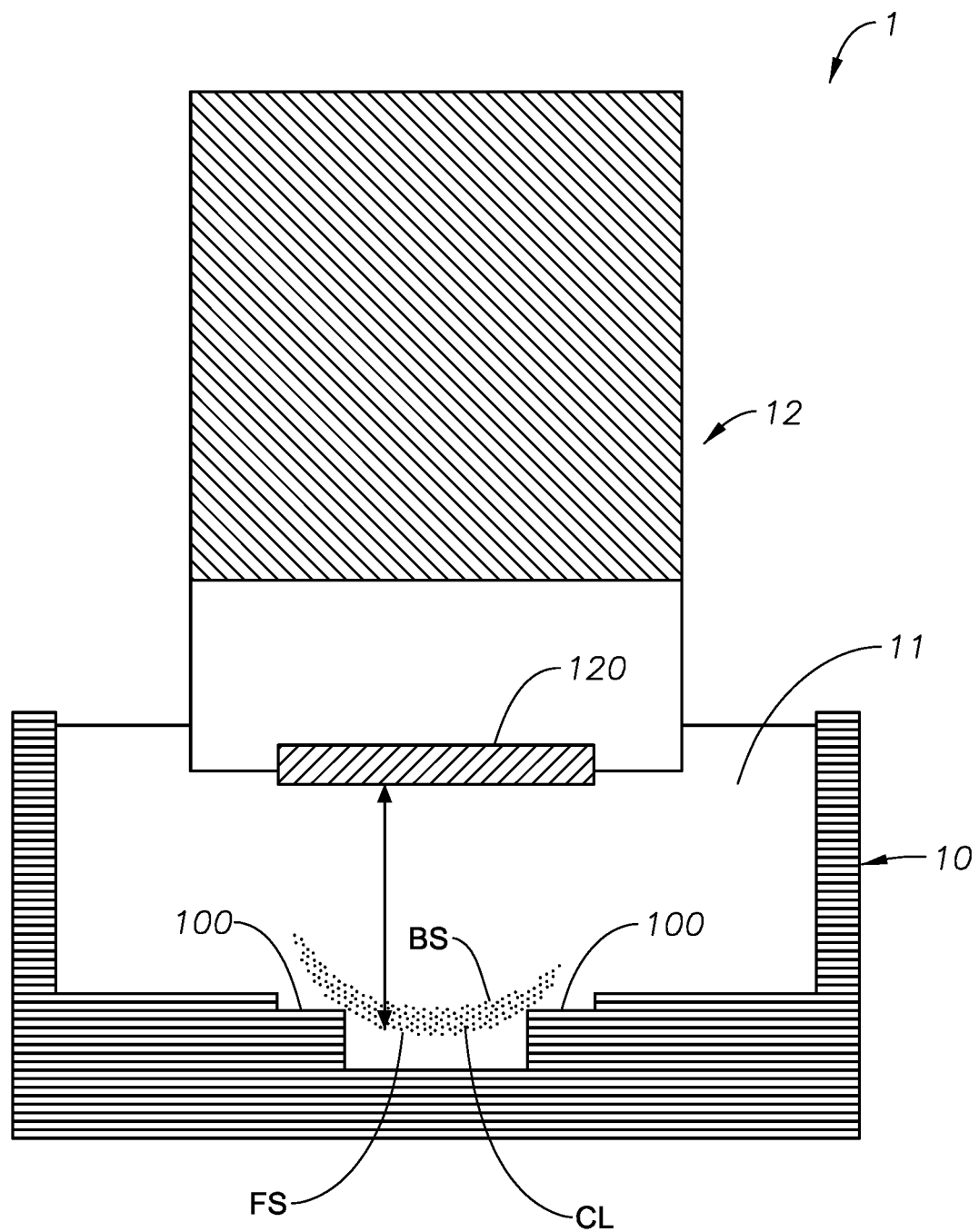
FIG. 1 shows a measurement assembly that can be used for performing the method according to the invention.

In FIG. 1 a measurement assembly is shown that can be used to perform the method according to the invention. The measurement assembly 1 comprises a container 10 filled with an aqueous liquid 11, for example with buffered saline. The container 10 comprises a support surface 100 on which a soft contact lens CL to be inspected rests, the lens being completely immersed in the aqueous liquid 11. A probe head 12 of an Optical Coherence Tomography (OCT) imaging device comprises a scanning mirror (not shown) for directing light from an OCT light source (not shown) of the OCT imaging device across the soft contact lens CL to be inspected. The probe head 12 further comprises a planar liquid dip window 120 which is arranged in the aqueous liquid 11 and through which light coming from the OCT light source impinges on the soft contact lens CL to be inspected. A normal to the planar liquid dip window 120 is arranged slightly inclined relative to the direction of the light coming from the OCT light source in order to avoid back reflections of the light coming from the OCT light source at the planar liquid dip window 120. The double-headed arrow in FIG. 1 indicates OCT light impinging on and back scattered from the soft contact lens CL (for generating the OCT image).

As can be seen in FIG. 1, the concave back surface BS of the soft contact lens CL is arranged such that light coming from the OCT light source impinges on the back surface BS of the soft contact lens, whereas in prior art measurement assemblies the light has impinged on the front surface FS of the lens. As can also be seen in FIG. 1, the soft contact lens CL rests on the support surface 100 in a manner slightly tilted relative to a normal on the support surface 100 (although in FIG. 1 the soft contact lens CL is not deformed).

Figure 2:
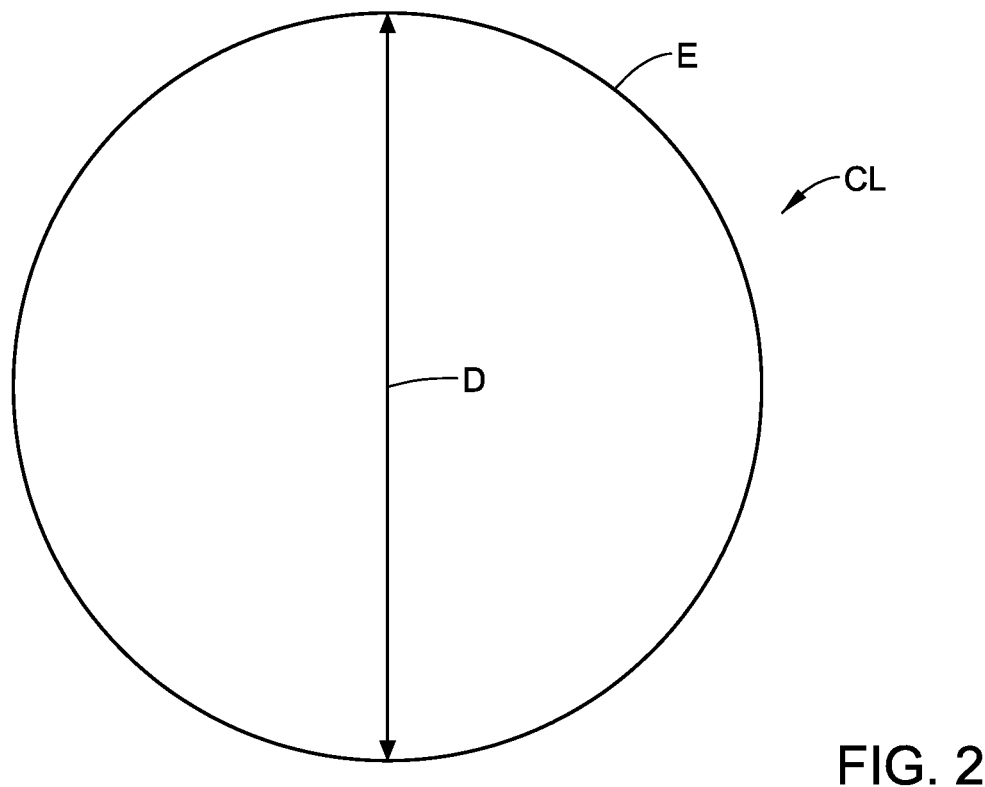
FIG. 2 shows a contact lens having a circular edge.
Figure 3:
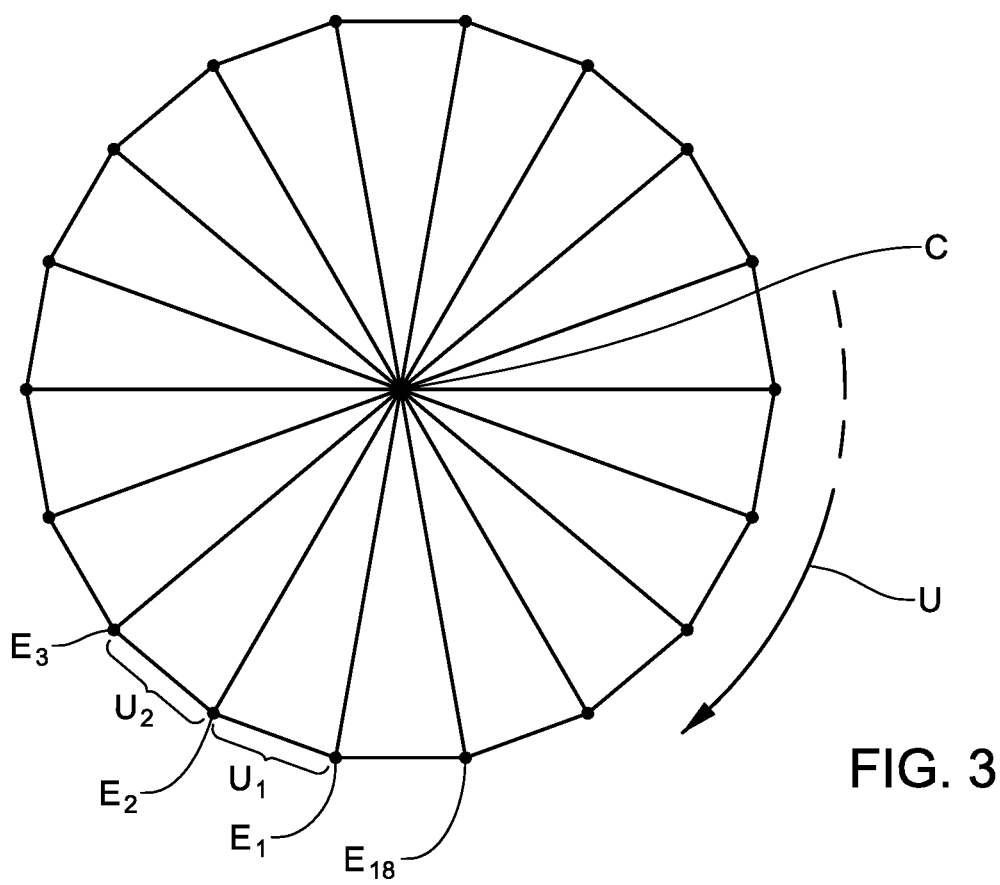
FIG. 3 shows how the circumference of the contact lens of FIG. 2 is approximated by straight lines connecting adjacent edge points located on the edge of the contact lens.

FIG. 2 shows the edge of a soft contact lens CL which is neither deformed nor tilted and therefore has a perfectly circular shaped lens edge E. FIG. 3 illustrates the manner of approximation of the circumference of the soft contact lens CL shown in FIG. 2. The tilted arrangement of the soft contact lens CL shown in FIG. 1 is not shown in FIG. 2 and FIG. 3, since FIG. 2 and FIG. 3 are only used for the purpose of explaining the general principle how the length U of the approximated circumference of the soft contact lens CL is determined (FIG. 3). In general, once the length U of the approximated circumference is determined, the diameter D of the soft contact lens is determined according to the equation $D = U/\pi$.

Figure 6:
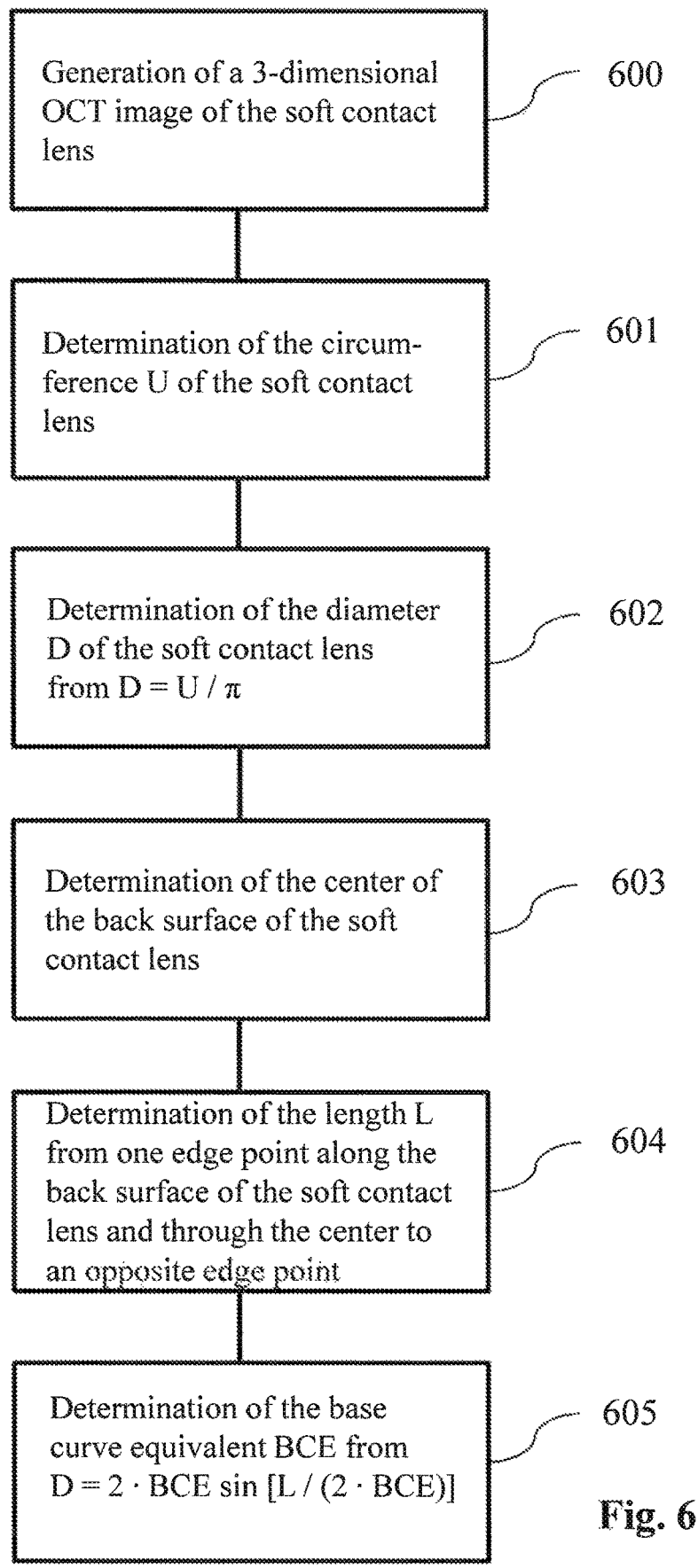
FIG. 6 shows a flow chart for determining the diameter D and the base curve equivalent of the soft contact lens.

This determination of the diameter is also represented by the first three steps 600, 601, and 602 of FIG. 6.

The length U of the approximated circumference is determined with the aid of a plurality of edge points $E_i$ ($E_1$, $E_2$, $E_3$, . . . , $E_{18}$) located on the lens edge E of the soft contact lens (see FIG. 3). Adjacently arranged edge points $E_i$ (e.g. $E_1$, $E_2$; $E_2$, $E_3$; etc.) are connected by (individual) straight lines as shown in FIG. 3, and the sum of the lengths $U_i$ ($U_1$, $U_2$, . . . ) of these (individual) straight lines represents the length U of the approximated circumference. While this principle is shown in FIG. 3 for a number of eighteen edge points for the sake of better illustration, the number of edge points $E_i$ is typically much higher than eighteen (and may amount to one hundred or more). Obviously, the higher the number of edge points the shorter is the distance between adjacently arranged edge points $E_i$, and the smaller is the difference between the actual circumference and the length U of the approximated circumference represented by the sum of the lengths $U_i$ of the individual straight lines.

Generally, the locations of the edge points $E_i$ (see FIG. 3) on the edge of the soft contact lens can be determined from the three-dimensional OCT image using any method suitable for this purpose. According to a particular aspect, however, they can be determined with the aid of a plurality of two-dimensional OCT light sections which can be generated from the three-dimensional OCT image of the soft contact lens, with each such individual two-dimensional OCT light section comprising two edge points $E_i$. This is possible even without knowing the center of the soft contact lens and regardless of whether or not the center of the soft contact lens is contained in such individual two-dimensional OCT-light sections, since each of the two-dimensional OCT-light sections comprises two edge points located at opposite ends of the two-dimensional OCT-light section. For the sake of simplicity, let us assume that such two-dimensional OCT-light section comprises the edge point $E_1$ and the edge point $E_{10}$ (see FIG. 3) arranged oppositely relative to the center of the soft contact lens (although that center may not yet be known). A boundary curve bounding this two-dimensional OCT-light section is then defined. The curvature of this boundary curve (which is represented by the second derivative of the boundary curve) has two maxima which are located at opposite ends of the boundary curve. The locations (coordinates) of these two maxima of the second derivative of the boundary curve are then determined to be the edge points $E_1$ and $E_{10}$. This also applies when the soft contact lens is deformed.

Once the edge points $E_i$ and the diameter D (D=U/π) are determined (in whichever manner this is done), the center C of the back surface of the soft contact lens may be determined by extracting the back surface from the three-dimensional OCT image of the soft contact lens. As has been explained further above, the center C of the back surface BS is that point on the back surface BS of the soft contact lens from which the sum of all shortest distances along the back surface BS to the individual edge points $E_i$ (see FIG. 3) is minimal. As also mentioned, determination of such point on a surface is a known problem for surfaces having an arbitrary geometry and can be solved with the aid of a suitable software like MATLAB available from the company Math-Works, Natick, Mass., U.S.A.

In the case of an edge E of a contact lens that has a round (circular) edge, the distance from the center C of the back surface to all edge points along the back surface of the contact lens has the same length (see FIG. 3). To find the said center of the back surface, a virtual center (i.e. a possible center) of the back surface of the soft contact lens is selected. For each of the edge points $E_i$ located on the edge E of the soft contact lens the shortest length from that virtual center (which may not be the true center of the back surface of the contact lens) along the back surface to the respective edge point is determined. Thereafter, it is determined whether all individual shortest lengths from the virtual center along the back surface BS of the soft contact lens to the edge points $E_i$ have the same length. If they all have the same length, then this virtual center is determined to be the center C of the back surface BS of the soft contact lens. Otherwise, a new virtual center is selected and the shortest lengths from the new virtual center to the edge points $E_i$ are determined again, until they all have the same length. This process is typically (iteratively) carried out by the software running on a computer. In a practical embodiment, the term 'same length' in this regard means that the difference between the longest one and the shortest one of the shortest lengths from a virtual center along the back surface to the edge points of the soft contact lens is smaller than a predetermined (small) threshold. The first virtual center for which this threshold condition is fulfilled is determined to be the center C of the back surface BS of the soft contact lens (in order to minimize the computer time for calculation). Otherwise, the computer may continue running the (iterative) process endlessly in an attempt to find a virtual center for which the condition regarding 'the same length' is met is even better.

The same principle is equally applicable for tilted and/or deformed soft contact lenses from which the three-dimensional OCT image is generated. In such case, the individual straight lines connecting adjacent edge points $E_i$ are not arranged in a single plane (as shown in FIG. 3 for illustrative purposes) but extend in the three-dimensional space. The individual lengths $U_i$ of the straight lines connecting the adjacent edge points $E_i$ can be calculated from the coordinates of the edge points in the three-dimensional space. From the individual lengths $U_i$ the length U of the approximated circumference can be calculated by summing up the lengths $U_i$ of the individual straight lines, and the diameter D can be determined as described above according to D=U/π. This is possible due to the assumption that the overall volume and the overall surface of a soft contact lens do not change in case the soft contact lens deforms.

Figure 4:
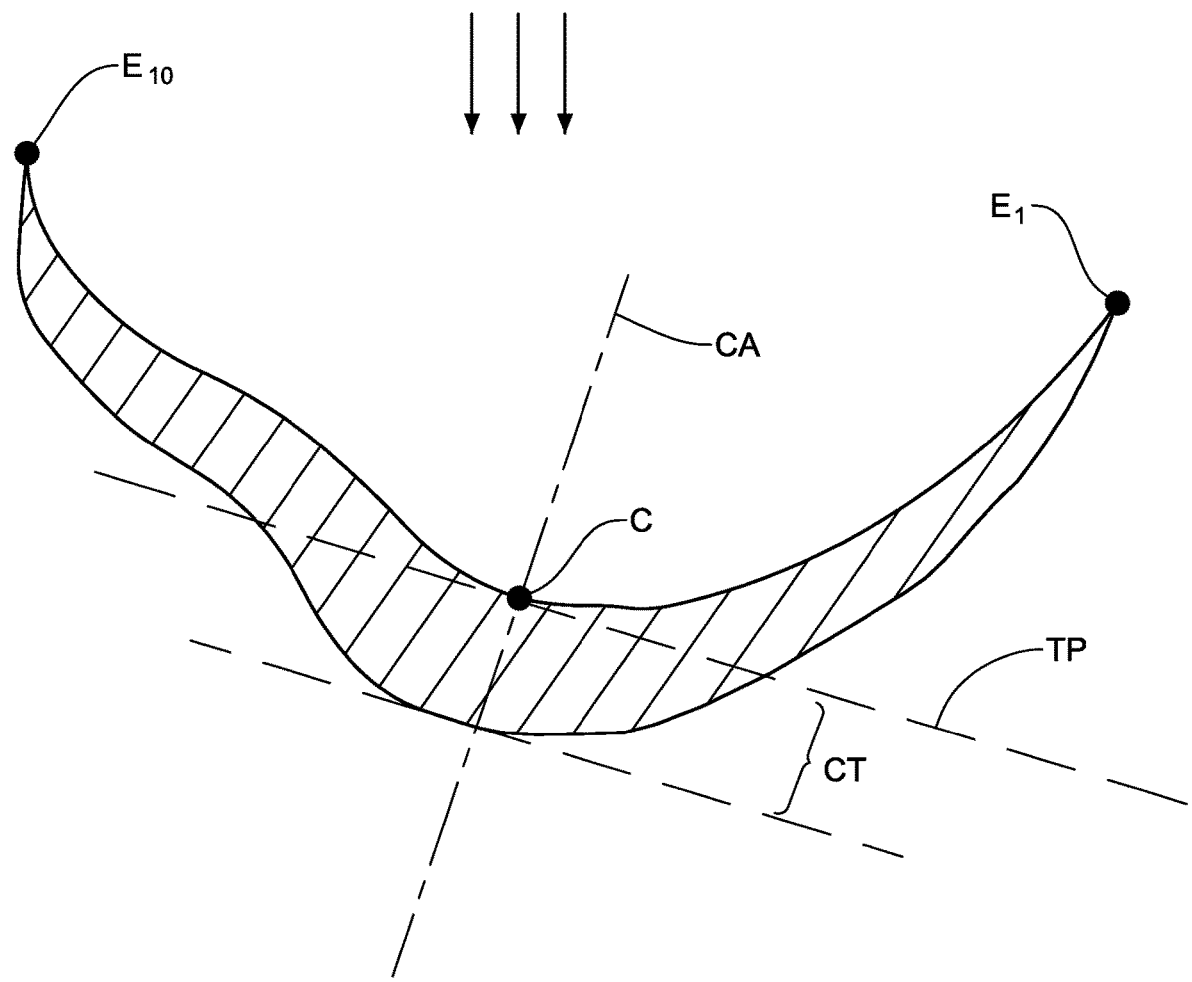
FIG. 4 shows a two-dimensional OCT light section through a soft contact lens that has substantially deformed with the boundary curve bounding the two-dimensional OCT light section.

FIG. 4 shows a two-dimensional OCT light section (generated from the three-dimensional OCT image) of a (tilted) and substantially deformed soft contact lens, with a boundary curve bounding the two-dimensional OCT light section. This two-dimensional OCT light section comprises the center C of the soft contact lens as well as the first edge point $E_1$ and the second edge point $E_{10}$ located opposite to the first edge point relative to the center C of the back surface BS of the soft contact lens. The first edge point $E_1$ and the second edge point $E_{10}$ have been chosen for reasons of simplicity although other edge points $E_i$ located opposite to the center C of the back surface BS may be chosen.

In the following, determination of the base curve equivalent BCE of the soft contact lens is described. As has been explained above, the center C of the back surface BS of the soft contact lens is that point from which the sum of all shortest distances to the to the individual edge points $E_i$ (see FIG. 3) on the edge E of the soft contact lens is minimal and from which all these shortest distances are equal.

Figure 5:
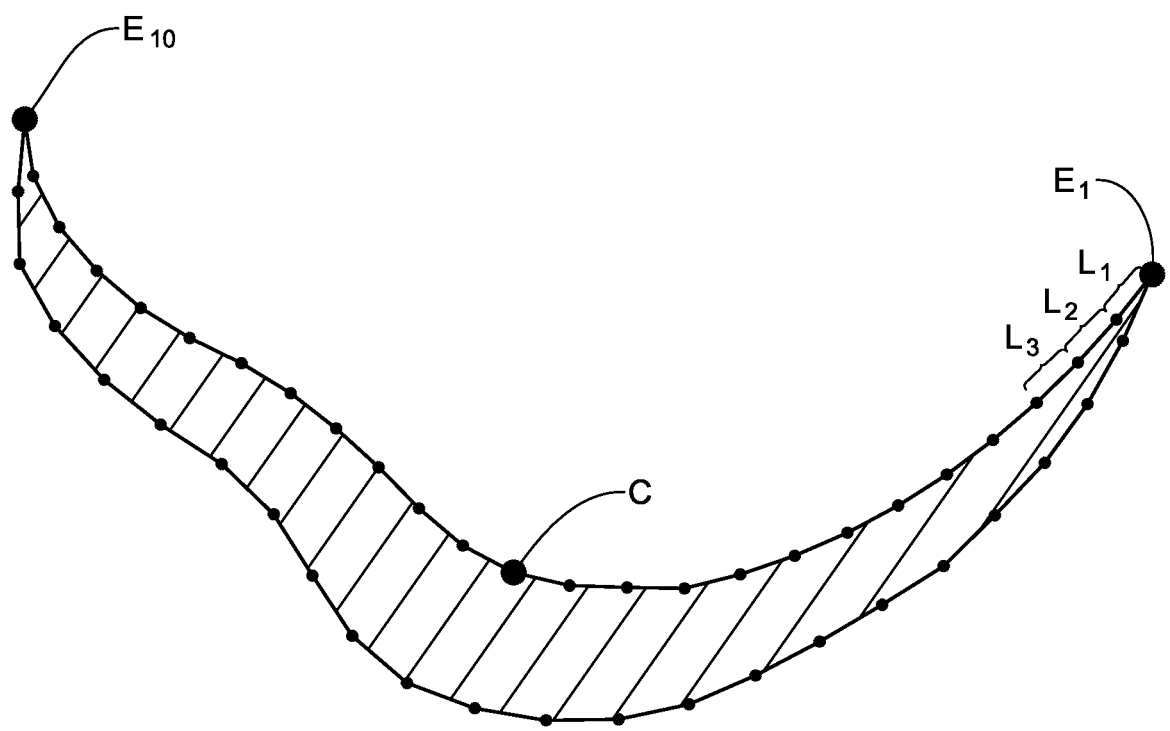
FIG. 5 shows the soft contact lens of FIG. 4, with the boundary curve bounding the two-dimensional OCT light section being approximated through straight lines.

For the determination of the base curve equivalent BCE the length L from the first edge point $E_1$ along the back surface BS of the soft contact lens to the second edge point $E_{10}$ is to determined. This length L from $E_1$ to $E_{10}$ along the back surface may be determined through approximation by the sum of a plurality of straight lines connecting adjacent points arranged on the back surface of the soft contact lens, as this is shown in FIG. 5. The lengths $L_i$ ($L_1$, $L_2$, $L_3$, . . . ) of the individual straight lines along the back surface are summed up, and this sum represents the length L along the back surface. Again, the higher the number of individual straight lines along the back surface, the better is the approximation. The base curve equivalent BCE is then numerically determined from the equation D=BCE·sin (L/[2·BCE]), with D representing the diameter of the soft contact lens and L representing the length along the back surface of the respective two-dimensional OCT light section.

This manner of determining the base curve equivalent BCE (with the foregoing determination of the lens diameter D) is shown in the flow chart of FIG. 6. In particular, the determination of the center C of the back surface of the soft contact lens, the determination of the length L along the back surface and the subsequent numerical determination of the base curve equivalent BCE is shown in steps 603, 604, and 605 of FIG. 6.

In case a two-dimensional OCT light section extends through the central reflex (which may in particular occur in a central area of the back surface when the soft contact lens is not tilted at all or is tilted only very slightly, so that the light from the OCT light source impinges vertically on the back surface in a central area of the back surface) it may not be possible to properly determined the length L due to strength of the central reflex (brightness). In such case, a further three-dimensional OCT image may be generated by irradiating the soft contact lens with light of lower intensity from the OCT light source, so that the central reflex is attenuated in the further three-dimensional OCT image. In the central area (which may have a radius of 1 mm about the center of the back surface) the further three-dimensional image may then be used (instead of the three-dimensional OCT image at normal intensity) for determining the length L.

Figure 7:
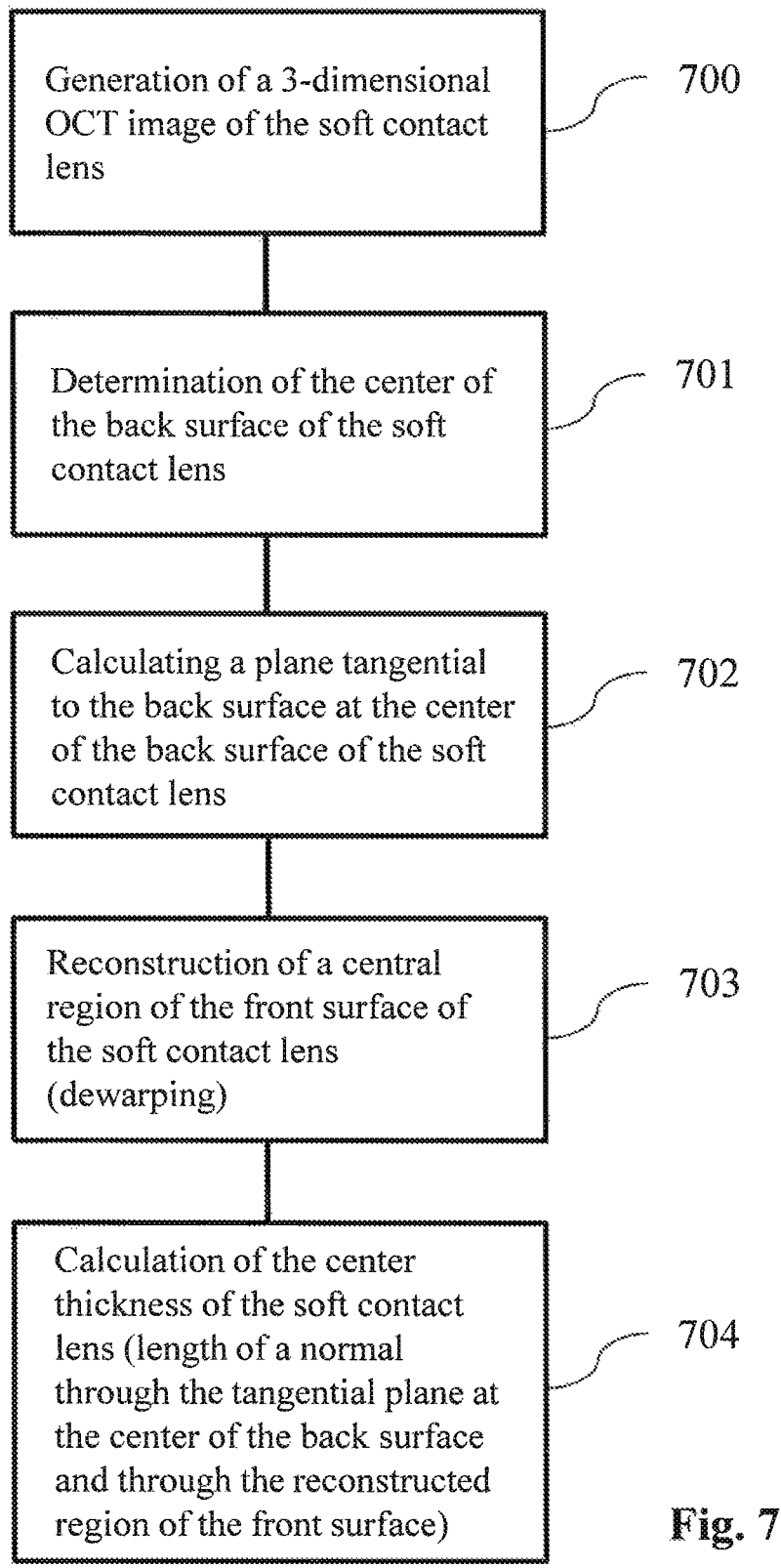
FIG. 7 shows a flow chart for determining the center thickness of the soft contact lens.

For determining the center thickness CT of the soft contact lens, it must be taken into account that the soft contact lens may be deformed and/or tilted so that it is necessary to determine the proper direction in which the center thickness CT of the soft contact lens must be measured, see FIG. 4. For that reason, a plane TP tangential to the back surface at the center C (already determined) of the back surface is calculated, and a central axis CA is determined that runs through the center C of the back surface of the soft contact lens and perpendicular to (i.e. normal to) the tangential plane TP, and which in its further course intersects the front surface of the soft contact lens. Since the light from the OCT light source (indicated by the unlabeled arrows above the lens) may not impinge in the same direction in which the center thickness is to be determined (i.e. the lens may be tilted), a dewarping calculation may become necessary for the single point at which the central axis CA intersects the front surface of the soft contact lens to be able to properly determine the center thickness CT (i.e. the refractive index of the lens material at the wavelength of the OCT light must be taken into account). These steps are shown in FIG. 7, with step 700 representing the generation of the three-dimensional OCT image, step 701 representing the determination of the center C of the back surface, step 702 representing the calculation of the tangential plane TP, step 703 representing the dewarping calculation, and step 704 representing the calculation of the distance between the center C of the back surface and the point of intersection of the axis CA and the front surface as representing the center thickness CT.

While the invention has been described with reference to particular embodiments shown in the drawings, the invention is not intended to be limited to these embodiments, but rather various modifications may be possible without departing from the teaching underlying the invention. Therefore, the scope of protection is defined by the appended claims.

The invention claimed is:

1. Method for determining geometrical parameters of a soft contact lens (CL), the method comprising the steps of
providing an OCT imaging device comprising an OCT light source;
providing a soft contact lens (CL) having a back surface (BS) and a front surface (FS);
arranging the soft contact lens (CL) relative to the OCT imaging device such that light coming from the OCT light source impinges on the back surface (BS) of the soft contact lens (CL);
irradiating the soft contact lens (CL) with light from the OCT light source and generating a three-dimensional OCT image of the soft contact lens (CL) using the OCT imaging device;
from the three-dimensional OCT image determining a plurality of edge points ($E_i$) located on the edge (E) of the soft contact lens (CL);
connecting adjacent ones ($E_i, E_2; E_2, E_3$) of the edge points in a circumferential direction by individual straight lines, each of the individual straight lines having a length ($U_i$), to form an approximated circumference of the soft contact lens (CL);
summing up the lengths ($U_i$) of all individual straight lines, the sum of the lengths of all individual straight lines representing a length U of the approximated circumference of the soft contact lens (CL);
from the so determined length U of the approximated circumference of the soft contact lens (CL) determining a diameter D of the soft contact lens (CL) according to the equation D=U/π.

2. Method according to claim 1, the method further comprising the step of determining a center (C) of the back surface (BS) of the soft contact lens by extracting the back surface (BS) of the soft contact lens (CL) from the three-dimensional OCT image, and by determining that point on the back surface (BS) to be the center (C) of the back surface (BS) from which a sum of all shortest distances from that point along the back surface (BS) to all edge points ($E_i$) is minimal.

3. Method according to claim 2, further comprising the step of determining a length L along the back surface (BS) from a first edge point ($E_1$) of the plurality of edge points ($E_i$) through the center (C) to a second edge point ($E_{10}$) located opposite to the first edge point ($E_1$) relative to the center (C), and further determining a base curve equivalent BCE of the soft contact lens from the length L and the diameter D of the soft contact lens using the equation: D=2 BCE sin (L/[2·BCE]).

4. Method according to claim 3, wherein in case a central reflex occurs in the three-dimensional OCT image in a central area of the back surface (BS) of the soft contact lens (CL) caused by irradiating the soft contact lens with light from the OCT light source, a further three-dimensional OCT image is generated by irradiating the soft contact lens (CL) with light of lower intensity from the OCT light source, with the central reflex being attenuated in the further three-dimensional OCT image to allow for determining the length L along the back surface (BS) or the center thickness (CT) of the soft contact lens, and wherein in the central area of the back surface of the soft contact lens (CL) the further three-dimensional image is used for determining the length L along the back surface (BS) or the center thickness (CT) of the soft contact lens (CL), or for determining both the length L along the back surface (BS) and the center thickness (CT).

5. Method according to claim 2, wherein further a center thickness (CT) of the soft contact lens (CL) is determined from the three-dimensional OCT image by calculating, at the center (C) of the back surface (BS) of the soft contact lens (CL), a plane (TP) tangential to the back surface (BS) of the soft contact lens (CL), determining an axis (CA) running perpendicular to this tangential plane (TP) through the center (C) of the back surface (BS) of the soft contact lens (CL) and through the front surface (FS) of the soft contact lens (CL), and determining the center thickness (CT) of the soft contact lens (CL) to be the distance between the center (C) of the back surface (BS) of the soft contact lens (CL) and the intersection of the axis (CA) with the front surface (FS) of the soft contact lens (CL).

6. Method according to claim 1, further comprising the steps of:
from the three-dimensional OCT image generating a plurality of two-dimensional OCT light sections of the soft contact lens (CL), each individual two-dimensional OCT light section of the plurality of two-dimensional OCT light sections of the soft contact lens (CL) comprising two edge points ($E_1, E_{10}$) of the plurality of edge points ($E_i$);

defining a boundary curve bounding each individual two-dimensional OCT light section;
determining the second derivative of the boundary curve of the two-dimensional OCT light section; and
determining the two edge points ($E_1$, $E_{10}$) to be located at those locations at opposite ends of the two-dimensional OCT light section where the second derivative of the boundary curve of the two-dimensional OCT light section has a maximum.

7. Method according to claim 1, wherein the soft contact lens (CL) is arranged in a container (10) filled with an aqueous liquid (11).

8. Method according to claim 7, wherein the step of providing an OCT imaging system comprises providing an OCT imaging system having a probe head (12) comprising a planar liquid dip window (120) through which the light from the OCT light source irradiates the soft contact lens (CL) immersed in the aqueous liquid (11) in a predetermined irradiation direction, with a normal on the planar liquid dip window (120) being arranged inclined relative to the predetermined irradiation direction.

9. Method according to claim 7, wherein the aqueous liquid is water, buffered solution or a mixture of the water and the buffered solution.

\* \* \* \* \*